April 14, 1970
H. L. WHITEHOUSE
3,505,928
SYSTEM FOR PERFORMING TOOL OPERATION AND
SIGNALING COMPLETION THEREOF
Filed July 21, 1967
2 Sheets-Sheet 1
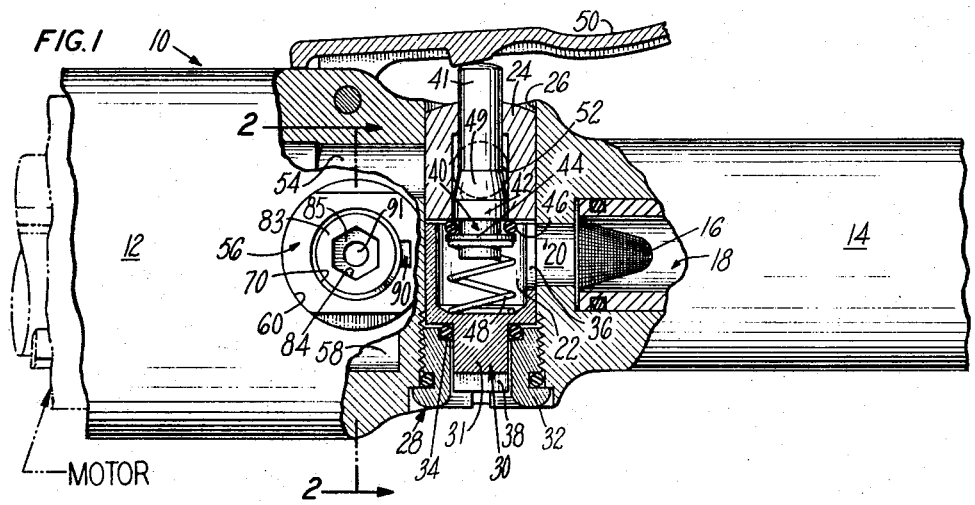
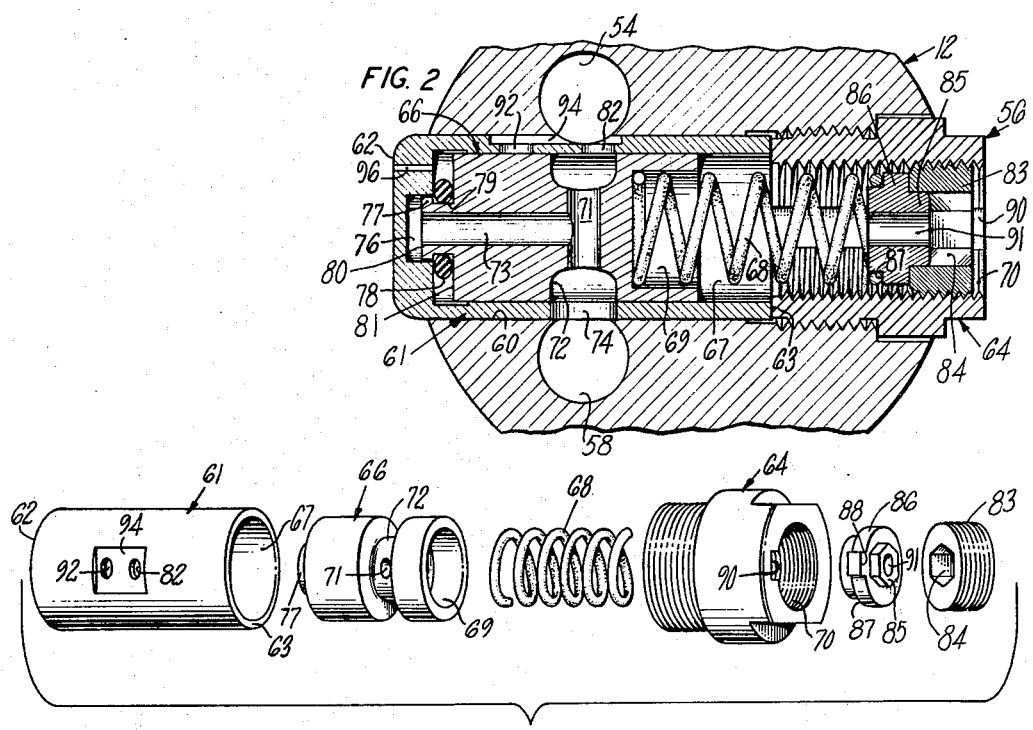
INVENTOR.
HUGH L. WHITEHOUSE
BY
Lindsey, Drutzman and Hayes
ATTORNEYS April 14, 1970    H. L. WHITEHOUSE    3,505,928
SYSTEM FOR PERFORMING TOOL OPERATION AND
SIGNALING COMPLETION THEREOF
Filed July 21, 1967    2 Sheets-Sheet 2

United States Patent Office 3,505,928
Patented Apr. 14, 1970

3,505,928
SYSTEM FOR PERFORMING TOOL OPERATION AND SIGNALING COMPLETION THEREOF
Hugh L. Whitehouse, South Euclid, Ohio, assignor to The Stanley Works, New Britain, Conn., a corporation of Connecticut
Filed July 21, 1967, Ser. No. 655,079
The portion of the term of the patent subsequent to Mar. 19, 1985, has been disclaimed and dedicated to the Public
Int. Cl. F01b 25/26; F15b 11/08, 13/04
U.S. Cl. 91—1                                                                      1 Claim

ABSTRACT OF THE DISCLOSURE

A system for performing a tool operation and sensing the completion thereof including an air operated tool having an air motor, shut-off control handle having a supply passageway connected to the motor, a pressure sensitive valve movable in the passageway between an operative position and a shut-off position for controlling air flow to the motor, a signaling means, and sensing means connected between the shut-off control handle and the signaling means wherein the sensing means is operable only in response to the valve moving into shut-off position for automatically signaling completion of a tool operation during an operating cycle of the tool.

---

This invention generally relates to power tools and particularly concerns fluid operated tools such as nut setters, screw drivers and the like.

A principal object of this invention is to provide an improved system for performing a tool operation and automatically signaling completion thereof during an operating cycle of the tool.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is a fragmentary view, partly in section and partly broken away, of a power tool;

FIG. 2 is an enlarged section view, partly broken away, taken generally along line 2—2 of FIG. 1;

FIG. 3 is an exploded isometric view, on a reduced scale, illustrating component parts of a preferred embodiment of a torque control incorporated in the present invention;

Figure 4:
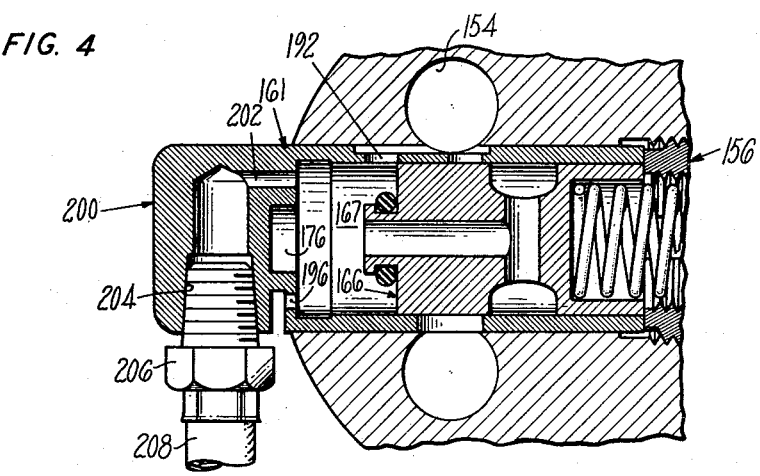
FIG. 4 is an enlarged section view, partly broken away, similar to FIG. 2 showing the torque control modified according to the present invention.

Referring now to the drawings in detail, a power tool such as a nut setter, e.g., is fragmentarily shown in FIG. 1 as having an elongated cylindrical housing 10 including a motor housing portion 12 and a handle portion 14 of reduced diameter. It is to be understood that a fluid motor, preferably a conventional rotary vane type air motor, is mounted in the motor housing portion 12 for driving a spindle operatively connected to a work engaging element of the power tool.

Compressed air for driving the motor is supplied through a coupling, not shown, at the rear of the handle portion 14 and flows through a suitable inlet screen 16 in a passageway 18, comprising a series of passages described more specifically below, leading to the motor. An inlet passage 20 of the passageway 18 communicates with a double diameter valve chamber 22 defined by a bushing 24, fixed in one end of a bore 26 extending across housing 10, and by an air regulator 28 closing the other end of the bore 26. The air regulator 28 includes an inner cup-like member 30, forming the larger end of the chamber 22, having a shank portion 31 of reduced diameter received in a hollow plug 32 screwed into the bore 26. Member 30 is retained against unintended movement by means of an "O" ring 34 encircling its shank portion 31 and seated on the inner end of the plug 32.

An inlet port 36 formed in the wall of member 30 serves to connect the inlet passage 20 and the chamber 22. The volume of air admitted into the chamber 22 is governed by rotatably adjusting the position of member 30 to vary the effective size of the inlet port, the adjustment being facilitated by a screw driver slot 38 which is easily accessible at the outer end of the shank portion 31. Assuming a load of established value, an operator thus may vary the power of the motor and the spindle speed to suit the application of the tool.

A throttle valve 40 is received in chamber 22 having a stem 41 projecting out through the bushing 24. An inner portion 42 of the throttle valve 40 is enlarged relative to the stem 41 and is provided with an annular flange 44 on one side of which is mounted an annular seal 46, engageable with the inner end of the bushing 24, and the other side seating a compression spring 48 biased between the flange 44 and member 30 to hold the throttle valve 40 in a normally closed position.

As pointed out more specifically below, it is important in tools of this type to effectively minimize the initial pressure surge of air supplied to the motor. For this reason, the throttle valve 40 is provided with a graduated intermediate portion 49 which is tapered from the enlarged inner portion 42 of the throttle valve 40 to its stem 41.

To actuate the motor, a hand lever 50, pivotally supported on the housing 10 and engaging the outer projecting end of the stem 41, is depressed to unseat the throttle valve 40. Air then enters chamber 22 through the inlet port 36 to pass through an outlet port 52 in the bushing 24 communicating with an inlet passage 54 to a normally open shut-off control 56, and then through the control 56 into an outlet passage 58 to the motor. It will be seen that the tapered structure of the throttle valve 40 provides an effective anti-surge control.

Referring now to the preferred embodiment of the shut-off or torque control 56 of the tool, a bore 60 is formed across the housing 10 for receiving a sleeve 61 having an outer closed end 62 at one end of the bore 60 and an open inner end 63 abutting a coaxially aligned hollow plug 64 screwed into the opposite end of the bore 60. The sleeve 61 is rigidly fixed in position by any suitable means.

For automatically shutting off air flow to the motor, a valve plunger or spool 66 is received in a chamber 67, defined by the inner surfaces of the sleeve 61, for reciprocating movement between open and closed positions respectively at the left and right hand ends of chamber 67 as viewed in FIG. 2. The closed end 62 of the sleeve 61 and the inner end of the plug 64 provide seats for the spool 66 in its open and closed positions. The spool 66 is illustrated as being normally held open in its left-hand position by a coil compression spring 68 having one end bearing against the bottom of a cup-shaped cavity 69 in the spool 66 and its opposite end being seated, as described more specifically below, within a threaded bore 70 extending through the plug 64.

So that the spool 66 is responsive to variations in the motor operating pressure, which is a function of the output force of the motor, for automatically shutting off air to the motor when a predetermined level of torque is reached, passages in communication with the outlet passage 58 are provided for continually directing compressed air against the spool 66 to provide a force in opposition to the spring force when the spool 66 is in its open position.

More specifically, a passage 71 is shown as extending diametrically through a reduced intermediate portion 72 of the spool 66, and another passage 73 extends from passage 71 axially through the left-hand end of the spool to provide internal passage means of generally T-shaped cross section. Passages 71 and 73 are in communication with an outlet port 74 in the sleeve 61 which connects to the outlet passage 58 leading to the motor when the spool 66 is in its open position.

The closed end 62 of the sleeve 61 includes a compartment 76 of circular cross section for receiving an annular extension 77 of reduced diameter in the end of the spool 66 surrounding the axially extending passage 73. The compartment 76 and the extension 77 are dimensioned to provide a preselected clearance between the spool 66 and the closed end 62 of the sleeve 61. This clearance preferably is maintained by an "O" ring 78 retained in a groove 79 around extension 77 to provide a tight fluid seal around compartment 76 when the spool 66 is in its open position. Thus, the end of the spool extension 77 provides a pressure sensing surface 80 which is in communication with the outlet passage 58 when the spool is in its open position, the pressure sensing surface 80 being relatively small with respect to the annular end surface 81 of the spool 66 surrounding the extension 77.

Power tools of this type are usually designed to minimize loss in pressure from the full line supply pressure, at the inlet of the handle, to the motor. However, there is always some reduction in pressure. At the inlet to the motor, e.g., orifice sizes are governed by practical limitations, and at free running some pressure reduction occurs because the orifice sizes cannot provide for the theoretical maximum air demand. If the orifice sizes at the inlet to the motor are small, the inherent internal leakage of the tool becomes effective at or near its stall point to reduce the operating air pressure in the motor below the full line supply pressure. Accordingly, such tools are conventionally designed such that the orifice capacity at the inlet to the motor is sufficiently large to allow for stall leakage with an insignification drop in motor operating pressure. Moreover, by providing for maximum orifice flow capacity, there is only a relatively small increase in the motor operating pressure from free running, through load, to or near stall.

To provide a torque control which is highly sensitive to variations in the output force or torque of the motor as indicated by changes in the static pressure in the outlet passage 58, a drop in the air supply pressure at the inlet to the motor is intentionally created across the spool 66. For this purpose a restrictive inlet port or orifice 82 is formed in the sleeve 61. Assuming that compressed air of relatively constant pressure is utilized to produce an air flow to the motor under variable torque conditions, the restrictive inlet orifice 82 will cause a reduction in air flow to the motor which, when running free, has a relatively large air flow capacity. Since air flow is low and demand is high, the motor operating pressure is low. As the motor is loaded, its air demand decreases and the motor operating pressure increases. Since the passages 71, 73 and the compartment 76 continually expose the small pressure sensing surface 80 of the spool extension 77 to the motor operating pressure in the outlet passage 58 and since this motor operating pressure is a function of the load on the motor, an automatic pressure actuated shut-off valve is attained which is sensitive to motor load over an amplified range of motor operating pressures. The action of the spool 66 is very fast since a small movement of the spool 66, caused by pressure on the small pressure sensing surface 80, unseats the O-ring 78, and exposes the annular end surface 81 of the spool 66. When end surface 81 is exposed, the force on the left of the spool 66 is suddenly greatly increased, causing the spool 66 to snap into its closed position at the right-hand end of chamber 67 with a minimum of time for motor output force to build up between the time of initial pressure sensing and complete shut-off.

It will be apparent that for a given size air motor and a given minimum air supply pressure, the torque at which shut-off automatically takes place is determined by the force of the spring 68. To preset the shut-off torque at a desired maximum value, an adjustment is provided for precisely varying the spring force exerted on the spool 66. An adjusting screw 83 is threadably received in the outer end of the bore 70 of plug 64. Extending axially through the adjusting screw 83 is a hex socket 84 for receiving a hex head 85 projecting from a circular plate 86 seated against the inner face of the adjusting screw 83 within the bore 70 of plug 64. The plate 86 has an annular shoulder 87 formed on its inner face for seating the spring 68. The spring 68 thus is biased between the spool 66 and the plate 86 to positively maintain the plate 86 securely in contact with the inner face of the adjusting screw 83. The plate 86 is limited to longitudinal movement within the plug 64 by means of a radial projection or tang 88 received in an axial groove 90 formed in the wall of the bore 70. To adjust the spring force exerted on the spool 66, and thus vary the amount of back pressure from the motor required to unseat the spool 66. a hex wrench, not shown, is inserted into the hex socket 84 such that plate 86 is pushed axially inward out of engagement with the adjusting screw 83 which may then be rotated by means of the wrench to provide a predetermined change in shut-off torque. Upon retracting the wrench, the hex head 85 of the plate 86 slips back into the hex socket 84 under the bias of spring 68 to positively lock the adjusting screw 83 in position. The plate 86 is provided with a central bore 91 serving to vent air trapped behind the spool 66 when it is snapped into its closed position.

As the spool 66 shuts off the passageway, closing the inlet and outlet ports 82 and 74 in sleeve 61, air behind the spool 66 exhausts to atmosphere through the bore 91 in the plate 86 and through the hex socket 84 of the screw 83. A second orifice 92, adjacent the inlet orifice 82, is simultaneously opened to maintain the spool 66 in its closed position, a notch 94 in the sleeve 61 providing a bypass clearance between the inlet passage 54 and the orifice 92. To assure rapid return of the spool 66 when the throttle lever 50 is released for a repeat control cycle, a bleed passage 96 is provided in the closed end 62 of the sleeve 61 to vent air trapped behind the spool 66. The bleed passage 96 also serves to prevent premature shut-off caused by air leakage past the spool 66.

Figure 5:
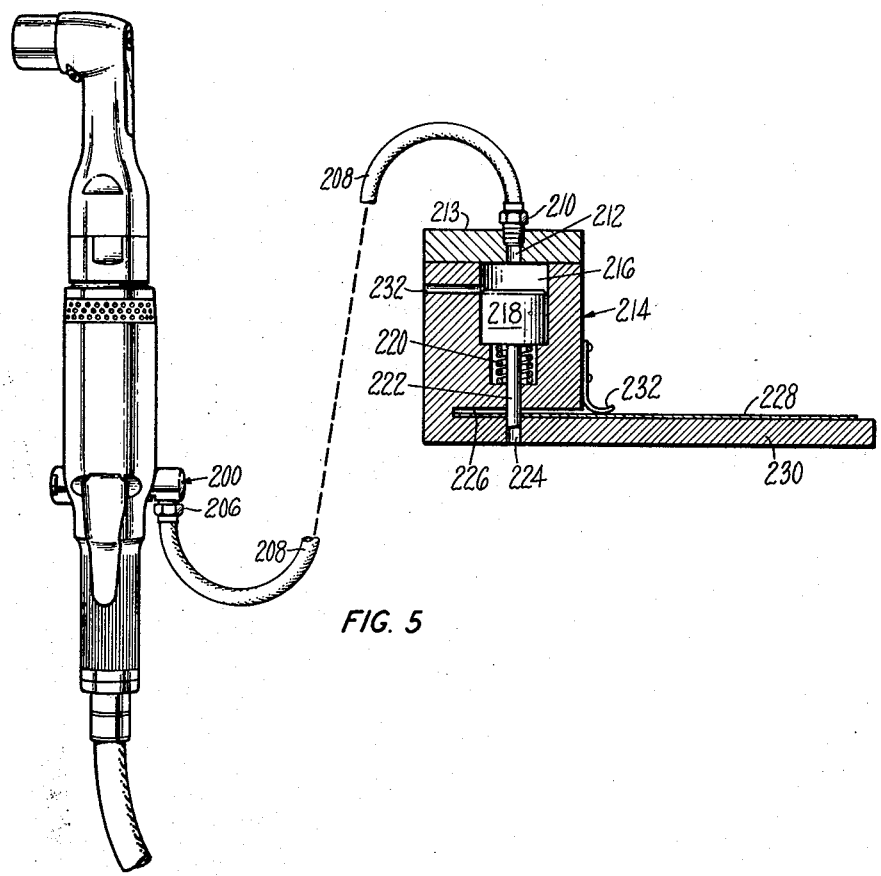
FIG. 5 is an isometric view of a tool on a reduced scale incorporating the torque control of FIG. 4 connected to a card punch assembly shown partly in section.

Referring now to FIGS. 4 and 5, a torque or shut-off control 156 is illustrated similar to that shown in FIG. 2 wherein the same numerals with the prefix 1 are utilized to identify like parts.

Upon movement of spool 166 into shut-off position, air under supply pressure enters chamber 167 to the left of the spool 166 from inlet passage 154 through orifice 192, and as in the first embodiment, air vents to atmosphere behind the spool 166 via bleed passage 196 provided in the closed end of the sleeve 161.

To signal completion of a work setting operation in accordance with another aspect of this invention, sleeve 161 is shown formed with an end extension 200 having an outlet passage 202 disposed radially outwardly of circular compartment 176 to connect chamber 167 with a pilot opening or outlet 204 which is suitably threaded to receive a fluid coupling such as at 206.

By virtue of this construction, inlet air will be directed to the outlet 204 only upon movement of the spool 166 into shut-off position thereby sensing the condition of the tool and automatically providing a fluid signal to the outlet 204 of a completed tool operation.

Turning now to a suitable indicator for signaling the condition of the tool, in the specific illustrated embodiment a conduit or line 208 is secured between coupling 206 and a fluid coupling 210 suitably fixed to an inlet passage 212 formed in an end plate 213 of a housing 214 in communication with a cylinder 216 formed therein with a piston 218 shown received for reciprocating movement in the cylinder 216. The piston 218 is normally maintained in a retracted position abutting end plate 213 under a biasing force of a return compression spring 220 coiled about a punch 222 axially projecting from the piston 218 and having an end portion received within a guideway 224 formed in the housing 214. The latter is shown having a notched recess 226 transversely intersecting the guideway 224 for receiving a card, e.g., such as illustrated at 228 which is maintained in position on a plate portion 230 of housing 214 by a spring clip 232 secured thereto with a portion of the card 228 received in the recess 226.

Upon completion of a tool operation, spool 166 snaps into shut-off position to close off fluid to the motor and open the outlet passage 202, whereby inlet air enters from chamber 167 and is transmitted through line 208 to drive piston 218 causing the card 228 to be punched and simultaneously uncovering an outlet passage 232 formed in housing 214 to vent the motive air to atmosphere, permitting piston 218 to return from extended to retracted position under the force of the return spring 220.

While it is believed that the operation of the tool will be apparent from the above description, the following brief summary of operation may be helpful in fully understanding the invention.

The air regulator 28 is adjusted to suitably set the power of the motor and spindle speed in accordance with an established load on the tool. The degree of compression of the spring 68, establishing the amount of air pressure required to unseat the spool 66, is precisely set by means of the hex-lock adjustment. Then as the throttle lever 50 is depressed to actuate the motor and any free movement of the work engaging element is taken up, the torque of the motor builds up in response to an increased load with a resultant build up in pressure thereby slowing down the motor and reducing its air consumption. It will now be apparent that the tapered structure of the throttle valve 40 effectively prevents premature shut-off of the control 56 by minimizing the initial pressure surge of air supplied to the motor.

By virtue of the restrictive inlet orifice 82, the motor operating pressure increases substantially from free running, through load, to or near stall. In view of this amplified range of motor operating pressures, the spool 66 is highly responsive to small pressure differences during the time the load is applied to the output force of the motor. As the present shut-off torque is approached, the air pressure builds in the outlet passage 58 and in the compartment 76 within the sleeve 61 as communicated through the outlet port 74 and the passages 71, 73. Thus, upon raching the preset shut-off torque, the pressure acting on the small pressure sensing surface 80 of the spool extension 77 within the compartment 76 reaches its adjusted maximum to overcome the atmospheric pressure and the spring force, and spool 66 shifts slightly to the right out of the compartment 76 to unseat the "O" ring 78 and then suddenly snaps into closed position when the large end surface 81 of the spool 66 is exposed to the back pressure from the motor. Further buildup in the motor output force is essentially negligible due to the snap action of the spool 66.

At the time the air flow is shut off to the motor, inlet air is directed from chamber 167 (FIG. 4) through line 208 via passage 202 and the outlet 204 to operate the piston 218 providing positive certification of a completed operation and upon releasing the throttle lever 50, it returns to normally closed position permitting spool valve return to its normally open position in readiness for the next operating cycle.

Since inlet air is directed to the outlet 204 at shut-off and only at shut-off, the above described system provides for a fail-safe signal simultaneously certifying that a fastening operation has been completed and has been accomplished at a proper torque level so as to be particularly suited for critical fastening operations. If the line pressure falls below the pressure necessary to reach a preselected fastener torque, no shut-off occurs and no signal will be transmitted. Moreover, the control adjustment feature as described above in connection with shut-off control 56 can be set independently for a variety of fastening operations, and while it is contemplated that a signal provided by the inlet air will normally be sufficient to provide ample flow capacity at outlet 204 by proper selection of diameters sizes for the passages 196 and 202 relative to that of the inlet orifice 192, a pilot valve, not shown, could also be utilized, e.g., downstream of the outlet 204, if desired, in accordance with well-known techniques.

The power tool of the present invention thus provides for automatically limiting the ouput torque or force of the motor to a predetermined level which may be precisely selected at any point in an amplified sensing range from no load to stall conditions without requiring an operator to exercise any further judgment in determining when the proper shut-off torque is reached. The tool provides almost instantaneous shut-off action for precision application and effectively eliminated premature shut-off. Accordingly, the tool is safe, quick and easy to operate. Since the tool is not required to run down to a stall point, it is not required to operate at maximum torque and the service life of its parts is prolonged. Finally, the maintenance requirements of the tool are minimized and the air required for operating the tool is reduced.

I claim:

1. In a system for performing a tool operation and signaling its completion which includes a fluid operated tool having a fluid motor, and a housing having a passageway for supplying fluid to the motor, an improvement comprising signaling means, and operating means for said signaling means including a fluid actuated torque sensing control movable in the passageway, said fluid actuated torque sensing control being movable in the passageway solely in response to fluid actuation from a first position establishing fluid flow to the motor to a shut-off position closing off fluid to the motor at a predetermined level of motor output as determined by fluid pressure acting on the motor, said fluid actuated torque sensing control upon being moved to said shut-off position connecting the passageway with said signaling means for actuating the same.

References Cited

UNITED STATES PATENTS

| | | | |
|---|---|---|---|
| 1,062,749 | 5/1913 | Townsend | 91—402 X |
| 2,188,948 | 2/1940 | Huebner | 91—402 X |
| 3,073,332 | 1/1963 | Strader | 137—119 X |
| 3,259,025 | 7/1966 | Kessler et al. | 91—1 |
| 3,373,824 | 3/1968 | Whitehouse | 91—468 X |
| 3,180,612 | 4/1965 | Spyridakis. | |

MARTIN P. SCHWADRON, Examiner

I. C. COHEN, Assistant Examiner

U.S. Cl. X.R.

81—52.5; 91—468; 137—119; 173—12